June 11, 1968

G. R. BRENCHLEY 3,387,748

MOTOR DRIVEN METERING VALVE

Filed Sept. 9, 1966

INVENTOR.
GEORGE R. BRENCHLEY
BY
Dean Sanford
ATTORNEY

INVENTOR.
GEORGE R. BRENCHLEY
BY
ATTORNEY

United States Patent Office 3,387,748
Patented June 11, 1968

3,387,748
MOTOR DRIVEN METERING VALVE
George R. Brenchley, 14740 E. Broadway,
Whittier, Calif. 90604
Filed Sept. 9, 1966, Ser. No. 578,273
17 Claims. (Cl. 222—70)

This invention relates to a device for controlling fluid flow, and more particularly to a metering valve for measuring and delivering a controlled volume of fluid. The device can be adapted for constant rate delivery wherein successive equal volumes of fluid are discharged at fixed time intervals, or alternatively, the time lapse between successive fluid volumes can be varied to effect delivery of the fluid at a variable rate.

In many industrial applications, the measurement and control of fluid flow, particularly at low flow rates, has presented a problem for which a complete and satisfactory solution has not heretofore been proposed. Conventional practice has been to separately measure the volume of a fluid flowing within a conduit with a rotometer, venturi meter, orifice meter, or a volume displacement meter, and then to control the rate of flow with a throttling valve, or the like. Because of cost and inherent inaccuracy, these devices have not universally met the need for a simple fluid volume flow control device, particularly in the lower capacity ranges. To meet this need, other types of fluid volume flow control devices have been developed. Of these, proportioning pumps have met wide acceptance in a number of commercial applications, primarily because of the accuracy which they provide. However due to their high cost, complexity, high space requirement and elaborate piping arrangement, proportioning pump installations are not attractive for many fluid flow applications.

Hence, a great need exists for a simple, inexpensive, relatively accurate means for controlling the volume of fluid flowing within a conduit, particularly at low volume flow rates. Typical of such applications are the withdrawal of representative samples of a fluid flowing within a pipeline; the injection of corrosion inhibitors and treating materials into oil wells, process vessels, piping systems and circulating cooling systems; the control of blend components and additives into a continuous blender; the control of lubricant flow in forced lubrication systems; and the control of fluid ingredients into batch or continuous process operations.

Accordingly, it is a principal object of the present invention to provide a device for controlling the volume of fluid flowing within a conduit. Another object is to provide a fluid metering and control device adapted for use at low volume flow rates. Another object is to provide a simple device for delivering a constant volume of fluid from a pressurized source. Another object is to provide a device for delivering a controlled variable volume of fluid. Still another object is to provide a device for delivering a controlled variable volume of fluid wherein the fluid volume is varied as a function of another variable. A still further object is to provide a simple, inexpensive flow control device having a high degree of accuracy and requiring a minimum of space and special piping connections. These and other objects will be apparent from the following description.

Briefly, the invention comprises a special ball valve assembly adapted for installation in a fluid conduit. The valve is fitted with a special ball assembly rotatably driven about an axis normal to the principal axis of the valve body. The ball is provided with a metering chamber comprising a diametral port passing entirely through the ball normal to its axis of rotation and fitted with a fluid tight free piston adapted to reciprocate therewithin. As the ball is rotated within the valve body, each of the port inlets are successively positioned in communication with the upstream fluid conduit, a shut off position, the down stream fluid conduit, and a second shut off position. When the ball rotates into a position such that the port is in communication with the fluid conduit, the upstream fluid pressure forces the piston to move toward the opposite end of the port, thus discharging fluid from the port on the downstream side and filling the port on the opposite side of the piston with fluid from the upstream source. This procedure is repeated at each half revolution of the ball, a measured quantity of fluid being discharged with each stroke of the piston. Since the ball assembly is fluid-tightly mounted in the valve body and the piston fluid-tightly installed within the port, all fluid passing through the conduit from upstream of the valve to downstream thereof must pass through the metering chamber. Constant fluid delivery rate is maintained by rotating the ball at a constant speed and a variable delivery rate can be attained by interrupting the rotation of the ball for a determined time period.

The invention will be more fully understood from the following detailed description and the accompanying drawings, in which.

Figure 1:
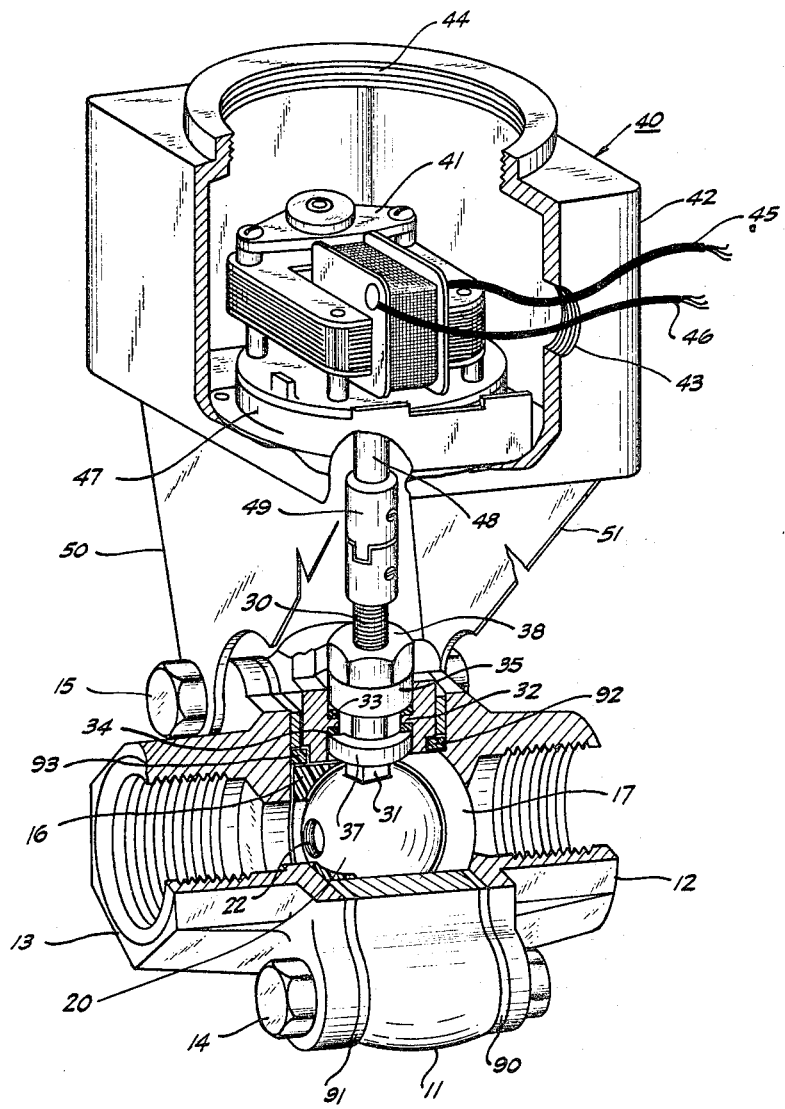
FIGURE 1 is a partially cutaway isometric view of one preferred embodiment of the device.

Referring now to FIGURE 1, metering valve 10 is comprised of valve body 11 having connectors 12 and 13 removably attached on either side thereof by bolts 14 and 15, a fluid tight joint being maintained between body 11 and the connectors. Valve body 11 is typically a cast annular member defining a central chamber adapted to receive ball seats 16 and 17 and ball 20. Connectors 12 and 13 can be adapted for threaded pipe connection, as illustrated, or can be adapted for socket weld or flanged connection directly to the conduit, thus affording simple installation in a piping system.

Figures 2, 3:
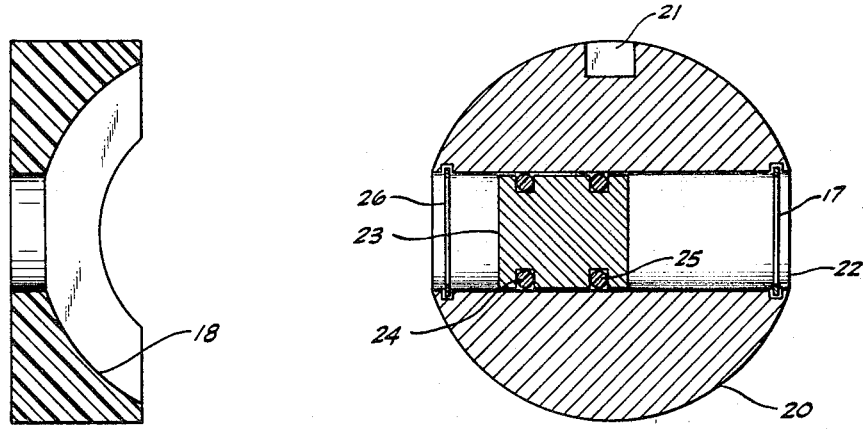
FIGURE 2 is a cross-sectional view of the ball assembly.
FIGURE 3 is a cross-sectional view of one ball seat.

As illustrated in FIGURE 2, ball 20 comprises a spherical metal body having a square drive socket 21 adapted to receive a drive means, the socket being cut into the periphery of the ball at its axis of rotation, and diametral port 22 passing entirely through ball 20 normal to the axis of rotation. Free piston 23 is fitted with sealing rings 24 and 25 and adapted to fluid-tightly reciprocate within port 22. While port 22 and piston 23 can be of any convenient cross-section, the illustrated circular cross-section is usually preferred. The longitudinal travel, or stroke, of piston 23 is limited in either direction by retainer rings 26 and 27, mounted in peripheral grooves on the interior of port 22. A metering chamber is formed within port 22 or either side of piston 23, the volume of each chamber being defined by the volume of the port between the retainer ring and the end of piston 23 when in a position of travel farthest removed from the respective retainer ring. Although not necessary, it is often preferable to plate the surfaces of ball 20 and piston 23 with nickel or other appropriate metal.

Ball seats 16 and 17 are annular rings of Teflon or other suitable plastic adapted to fit within body 11. As illustrated in FIGURE 3, ball seats 16 and 17 are provided with a concave inner surface 18 adapted to engage spherical ball 20 over a substantial portion of its surface. Ball 20 slidably engages the concave surface 18 of ball seats 16 and 17 so as to provide a fluid tight seal therebetween. By the construction, a differential pressure of 500 p.s.i. or more can exist across the ball assembly without appreciable fluid leakage.

Referring again to FIGURE 1, it can be seen that body 11 is provided with an opening to accommodate valve stem 30 having square end 31 adapted to engage square socket 21 in ball 20. Valve stem 30 is supported by shoulder 32 formed integrally with body 11. A fluid tight seal around valve stem 30 is effected by seal rings 33 and 34 engaging washers 35 and 37, as illustrated. The sealing assembly is retained by nut 38 threadably engaging a threaded section of stem 30. An additional Teflon seal ring, not shown, can be placed between nut 38 and washer 35.

Ball 20 is rotatively driven through stem 30 by drive assembly 40 which comprises synchronous electric motor 41 mounted in explosion proof housing 42. Housing 42 is provided with a threaded opening 43 adapted to receive an electrical conduit, not shown, containing electrical conductors 45 and 46, and access opening 44 adapted to be closed by a threaded cover plate, not shown. Motor 41 drives stem 30 through reduction gear 47 and drive shaft 48. Although any convenient speed reduction can be employed, typically a motor speed of about 1750 r.p.m. is reduced to about 1 r.p.m., or less. Drive shaft 48 is connected to stem 30 by universal joint assembly 49. Drive assembly 40 is integrally supported from the valve body by mounting brackets 50 and 51. Motor 41 provides rotative motion to ball 20 only, and does not provide energy to move the metered fluid through the conduit. Thus, motor 41 has a relatively low power requirement.

The volume of fluid delivered is effected by (1) the cross-sectional area of port 22 and (2) the stroke of piston 23, (3) the speed of motor 41, and (4) the gear ratio of reduction gear 47. In designing a metering valve for a particular application, these factors can be selected to obtain delivery of the desired fluid volume. While any of the foregoing design factors can be changed to vary the fluid volume delivered; in an existing installation, the volume delivery rate can be most easily varied by replacing piston 23 with a piston of greater or lesser length, or by replacing ball 20 with a ball having a different port diameter.

In its simplest embodiment, the metering valve of this invention is adapted to deliver successive equal fluid volumes at fixed constant time intervals, thus effecting the delivery of a constant cumulative volume over any relatively long time period. Constant volume operation is achieved by rotating the ball at a fixed constant speed such as is readily obtainable with a synchronous electric motor drive. Alternatively, any other suitable means of rotatively driving ball 20 can be employed.

Variable volume delivery can be achieved by any means of interrupting the rotation of ball 20. Variable volume operation can easily be attained by wiring the drive motor so that the power supply is alternately energized and de-energized. For example, the ball drive motor can be wired so that it is energized only when a pump is started; or a timing device can be employed to periodically interrupt the power supply for a pre-determined time period. Alternatively, the metering valve can be made responsive to the volume of fluid flowing in another conduit by employing a meter signal to energize the ball drive motor.

Figure 4:
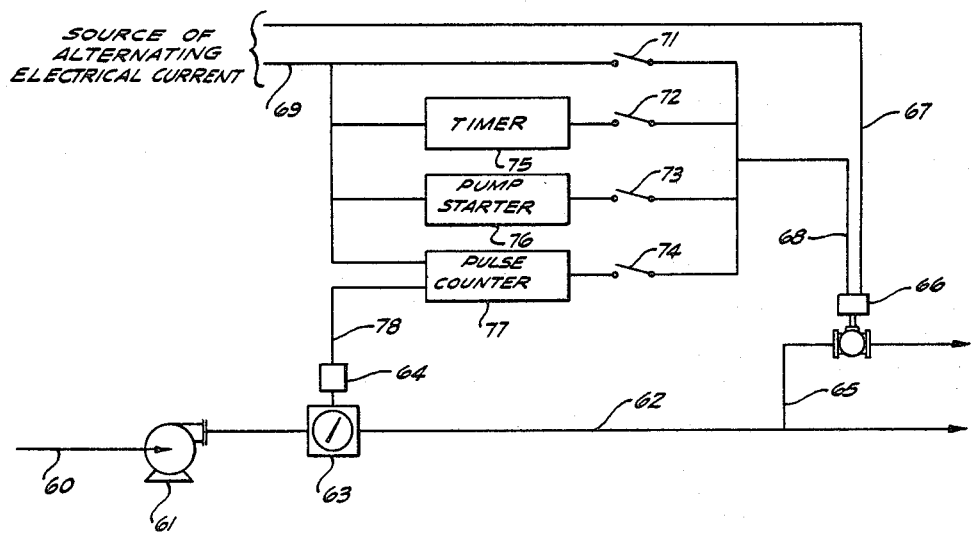
FIGURE 4 is a schematic diagram of a metering valve installation adapted for various modes of control.

These modes of operation are illustrated in FIGURE 4 wherein is seen a flow system comprising conduit 60 communicating a fluid source, not shown, with pump 61, main discharge conduit 62 containing displacement meter 63 having an electrical pulse generator 64 integral therewith, and branch conduit 65 containing metering valve 66 of the type hereinabove described. In operation, a fluid is pumped from the fluid source by pump 61 and discharged through conduit 62. A portion of the fluid stream flowing under pressure through conduit 62 is withdrawn through conduit 65 under control of metering valve 66. The ball drive motor of metering valve 66 is supplied with electrical power, through electrical conductors 67 and 68 connected to a source of alternating current. Metering valve 66 can be adapted for constant or variable rate service as follows.

In the case where it is desired that metering valve 66 deliver a constant fluid volume, switch 71 is closed, thereby providing the ball drive motor with a constant electrical supply. The ball is then rotatably driven at a constant speed so as to allow successive equal volumes of fluid to flow through conduit 65 at fixed constant time intervals.

Metering valve 66 can be periodically operated by closing switch 72. The power supply to the ball drive motor is periodically interrupted by timer 75 which can be pre-set to disconnect the power supply for a fixed constant time period or for a variable time period.

Metering valve 66 can be operated in conjunction with pump 61 by closing switch 73 which places pump starter 76 in the circuit.

Metering valve 66 is adapted to deliver a volume of fluid through conduit 65 proportional to the volume of fluid flowing through conduit 62 by closing switch 74. Electrical pulses are generated by pulse generator 64 proportional to the volume flow in conduit 62. These pulses are transmitted to pulse counter 77 via conductor 78. Pulse counter 77 totals the received pulses and after receiving a predetermined number of pulses, representative of a fixed volume passing through meter 63, energizes metering valve 66. The ball drive motor can be adapted to rotate for a single half revolution, a full revolution, or for a fixed number of revolutions, or it can be operated for a predetermined time period.

While various modes of operating metering valve 66 have been described, it is to be realized that the metering valve is not limited to the disclosed modes of operation. For example, other means of activating the electrical power supply to the ball drive motor can be employed. Also, the metering valve can be employed to add fluid to conduit 62, as well as to withdraw fluid therefrom.

Although the foregoing description has been primarily concerned with the adaptation of the metering valve of this invention to the control of liquid flow, the device is equally adaptable to the control of gases, suspensions, and semi-solids, such as greases and gels. Broadly, the metering valve is adaptable to the control of any fluid which can flow under pressure through a conduit.

Another feature of my metering valve is that, if desired, it can be easily constructed from a conventional ball valve of desired size. This conversion is readily accomplished by removing the valve handle and installing the special ball and ball drive assemblies. However, in the usual case where a conventional ball valve is converted to a metering valve, it is desirable to install a larger ball to accommodate the port. This can be readily accomplished by installing spacers 90 and 91 between body 11 and connectors 12 and 13 respectively. Sealing rings 92 and 93 are installed to provide a fluid-tight seal and ball seats 16 and 17 adapted to accommodate the larger ball.

Thus, while a preferred embodiment of the invention has been described, it will be obvious to those skilled in the art that it is not so limited, but is susceptible of various changes and modifications without departing from the spirit thereof.

Having now described the invention, I claim:

1. A device for controlling the volume of fluid flowing within a conduit, which comprises:

a body defining an enclosed internal chamber and having a fluid inlet and a fluid outlet in communication with said internal chamber;

a spherical ball rotatably mounted within said internal chamber and adapted to rotate around an axis normal to said body, said ball having a diametral port extending therethrough normal to the axis of rotation of the ball;

a piston reciprocally mounted within said port;
a pair of annular sealing rings adapted for mounting in said body on either side of said ball, said sealing rings having a concave inner surface adapted to frictionally engage said spherical ball over a substantial portion of its surface;
drive means for rotatably driving said ball; and
means for supporting said drive means from said body.

2. A device in accordance with claim 1 wherein said fluid inlet and said fluid outlet are threaded to engage a threaded conduit.

3. A device in accordance with claim 1 wherein said fluid inlet and said fluid outlet are fitted with pipe flanges.

4. A device in accordance with claim 1 wherein said fluid inlet and said fluid outlet are provided with socket weld fittings.

5. A device in accordance with claim 1 wherein the diametral port in said ball is cylindrical and wherein said piston has a cylindrical cross-section.

6. A device in accordance with claim 1 wherein said piston is fluid-tightly mounted within said port.

7. A device in accordance with claim 1 wherein said port is fitted with internal retainers to limit the travel of said piston within said port.

8. A device in accordance with claim 1 wherein said drive means comprises a synchronous electric motor driving said ball through a speed reducing gear.

9. A device in accordance with claim 1 in which said annular sealing rings are Teflon.

10. A device for installation in a fluid conduit for controlling the volume of fluid flowing within the conduit, which comprises:
a body defining an enclosed internal chamber and having a fluid inlet and a fluid outlet in communication with said internal chamber, said fluid inlet and said fluid outlet being adapted to fluid-tightly engage said conduit;
a spherical ball rotatably mounted within said internal chamber and adapted to rotate around an axis normal to said body, said ball having a square socket at its axis of rotation adapted to receive a drive shaft and a diametral, cylindrical port extending through said ball normal to the axis of rotation;
a free piston reciprocally mounted within said cylinder, said piston having a cylindrical cross-section and peripheral sealing rings to fluid-tightly engage the internal surface of said cylindrical port;
retainers installed adjacent the ends of said port to limit the longitudinal travel of said piston within said port;
a pair of annular sealing rings adapted for mounting in said body on either side of said ball, said sealing rings having a concave inner surface adapted to frictionally engage said spherical ball over a substantial portion of its surface;

a drive shaft having a square end adapted to fit said square socket in said ball, said shaft exiting said body through an opening in said body;
means for fluid-tightly sealing said opening in said body;
drive means connected to said drive shaft for rotatably driving said ball; and
mounting brackets to support said drive means from said valve body.

11. A device in accordance with claim 10 in which said body comprises an annular body member and a pair of removable connectors fluid-tightly attached to said annular body member.

12. A device in accordance with claim 10 wherein said drive means comprises a synchronous electric motor and a speed reducing gear mounted in an explosion-proof electric box and wherein a second drive shaft extends from said reduction gear to engage said first drive shaft on the exterior of said box.

13. A device in accordance with claim 10 in which said annular sealing rings are Teflon.

14. In combination:
a metering valve having a rotatable spherical ball fluid-tightly mounted therewithin, said ball having a diametral port extending therethrough normal to its axis of rotation;
a free piston reciprocally mounted within said port;
a synchronous electric motor adapted to rotatably drive said ball through a speed reducing gear; and
means for supporting said electric motor from the body of said valve.

15. The combination according to claim 14 including disconnect means for interrupting the electrical current to said electirc motor.

16. The combination according to claim 15 in which said disconnect means is time responsive and operates to interrupt the electrical current at predetermined time intervals for predetermined time periods.

17. The combination according to claim 15 in which said disconnect means are responsive to an external signal.

References Cited
UNITED STATES PATENTS

| 919,787 | 4/1909 | Sleeper | 222—219 |
|---|---|---|---|
| 1,882,697 | 10/1932 | Aldridge | 222—554 X |
| 1,887,347 | 11/1932 | Evans | 222—219 X |
| 2,969,632 | 1/1961 | Carew et al. | 222—219 X |
| 3,172,578 | 3/1965 | Kemp | 222—219 |
| 3,187,949 | 6/1965 | Mangel | 222—70 |

FOREIGN PATENTS 806,316   12/1936   France.

ROBERT B. REEVES, *Primary Examiner.*

HADD S. LANE, *Examiner.*